US009390522B2

(12) United States Patent
Ntziachristos et al.

(10) Patent No.: US 9,390,522 B2
(45) Date of Patent: Jul. 12, 2016

(54) SYSTEM FOR CREATING A TOMOGRAPHIC OBJECT IMAGE BASED ON MULTIPLE IMAGING MODALITIES

(75) Inventors: Vasilis Ntziachristos, Graefelfing (DE); Angelica Ale, Voorburg (NL)

(73) Assignee: Helmholtz Zentrum Muenchen Deutsches Forschungszentrum Fuer Gesundheit Und Umwelt (GMBH), Neuherberg (DE)

( * ) Notice: Subject to any disclaimer, the term of this patent is extended or adjusted under 35 U.S.C. 154(b) by 151 days.

(21) Appl. No.: 14/358,037

(22) PCT Filed: Nov. 18, 2011

(86) PCT No.: PCT/EP2011/005827
§ 371 (c)(1),
(2), (4) Date: Aug. 13, 2014

(87) PCT Pub. No.: WO2013/071942
PCT Pub. Date: May 23, 2013

(65) Prior Publication Data
US 2014/0363066 A1    Dec. 11, 2014

(51) Int. Cl.
*G06K 9/00* (2006.01)
*G06T 11/00* (2006.01)

(52) U.S. Cl.
CPC ........... *G06T 11/006* (2013.01); *G06T 2210/41* (2013.01); *G06T 2211/40* (2013.01)

(58) Field of Classification Search
None
See application file for complete search history.

(56) References Cited

U.S. PATENT DOCUMENTS

| 2011/0060211 A1* | 3/2011 | Lorenzo | A61B 5/0071 600/411 |
| 2013/0041261 A1* | 2/2013 | Li | A61B 8/15 600/442 |
| 2014/0363066 A1* | 12/2014 | Ntziachristos | G06T 11/006 382/131 |
| 2015/0219780 A1* | 8/2015 | Zeroug | E21B 47/0005 702/6 |

FOREIGN PATENT DOCUMENTS

| WO | 2005104038 A1 | 11/2005 |
| WO | 2008011112 A2 | 1/2008 |
| WO | 2011025950 A2 | 3/2011 |

OTHER PUBLICATIONS

Ale et al., "Imaging performance of a hybrid x-ray computed tomography-fluorescence molecular tomography system using priors", Med. Phys., vol. 37, No. 5, pp. 1976-1986 (2010).
Arridge, "Optical tomography in medical imaging", Inverse Problems, vol. 15, pp. R41-R93 (1999).
(Continued)

*Primary Examiner* — Tahmina Ansari
(74) *Attorney, Agent, or Firm* — Caesar Rivise, PC

(57) ABSTRACT

A system for creating an object image of an object under investigation, comprises a computing device being configured for creating the object image by using first tomography data of the object provided by a first tomography system and second tomography data of the object provided by a second tomography system, wherein the computing device is configured for calculating a first forward model describing the first tomography data using the second tomography data, performing a first inversion of the first forward model, calculating a parameter set using the first inversion, and performing a second inversion using the parameter set to obtain the object image to be created. Furthermore, a method of imaging an object under investigation is described, wherein the system for creating an object image is used.

17 Claims, 4 Drawing Sheets

(56) References Cited

OTHER PUBLICATIONS

Freyer et al., "Fast automatic segmentation of anatomical structures in x-ray computed tomography images to improve fluorescence molecular tomography reconstruction" Journal of Biomedical Optics, vol. 15. No. 3, pp. 036006-1-036006-8 (2010).

Hyde et al., "Data Specific Spatially Varying Regularization for Multimodal Fluorescence Molecular Tomography", IEEE Transactions on Medical Imaging, vol. 29, No. 2, pp. 365-374 (2010).

Lin et al., "Quantitative fluorescence tomography with functional and structural a priori information", Applied Optics, vol. 48, No. 7, pp. 1328-1336 (2009).

Niedre et al., "Elucidating Structure and Function In Vivo with Hybrid Fluorescence and Magnetic Resonance Imaging", Proceedings of the IEEE, vol. 96, No. 3, pp. 382-396.

Niedre et al., "Time-resolved imaging of optical coefficients through murine chest cavities", Journal of Biomedical Optics, vol. 11, No. 6, pp. 064017-1-064017-7.

Ntziachristos, "Fluorescence Molecular Imaging", Annu. Rev. Biomed. Eng., vol. 8, pp. 1-33 (2006).

Paige et al., "LSQR: An Algorithm for Sparse Linear Equations and Sparse Least Squares", ACM Transactions on Mathematical Software, vol. 8, No. 1, pp. 43-71 (1982).

Paige et al., "Algorithm 583 LSQR: Sparse Linear Equations and Least Square Problems", ACM Transactions on Mathematical Software, vol. 8, No. 2, pp. 195-209 (1982).

Sarantopoulos et al., "Imaging the Bio-Distribution of Fluorescent Probes Using Multispectral Epi-Illumination Cyroslicing Imaging", Mol. Imaging Biol, vol. 13, pp. 874-885 (2011).

Schulz et al., "Hybrid Fluorescence Tomography/X-ray Tomography improves reconstruction quality", Proceedings of SPIE, vol. 7370, pp. 73700H-73700H-4 (2009).

Schulz et al., "Hybrid FMT/XCT system validated with ex-vivo fluorescence", Communications and Photonics Conference and Exhibition, pp. 1-2 (2009).

Schulz et al., "Hybrid System for Simultaneous Fluorescence and X-ray Computed Tomography", IEEE Transactions on Medical Imaging, vol. 5, No. 2, pp. 465-473 (2010).

Soubret et al., "Accuracy of Fluorescent Tomography in the Presence of Heterogeneities: Study of the Normalized Born Ratio", IEEE Transactions on Medical Imaging, vol. 24, No. 10, pp. 1377-1386 (2005).

Turner et al., "Complete-angle projection diffuse optical tomography by use of early photons", Optics Letters, vol. 30, No. 4, pp. 409-411 (2005).

International Search Report for PCT/EP2011/005827 dated May 30, 2012.

\* cited by examiner

SYSTEM FOR CREATING A TOMOGRAPHIC OBJECT IMAGE BASED ON MULTIPLE IMAGING MODALITIES

FIELD OF THE INVENTION

The present invention generally relates to tomographic imaging systems and more particularly to the combination of two or more tomographic imaging systems and a computing device to obtain an image of an object. More particularly, the invention relates to a system for creating an object image of an object under investigation, in particular a computing device and/or a method being configured for creating the object image by using first tomography data of the object provided by a first tomography system and second tomography data of the object provided by a second tomography system. In preferred examples, the invention relates to multi modality systems in which one of the modalities is optical tomography and a second modality is an imaging modality that gives anatomical information such as X-ray CT, and to a computing device that can recover a fluorescence distribution inside an object.

BACKGROUND

In the present specification, reference is made to the following prior art documents:
[1] R. B. Schulz, A. Ale, A. Sarantopoulos et al., "Hybrid System for Simultaneous Fluorescence and X-Ray Computed Tomography," *IEEE Transactions on Medical Imaging*, vol. 29, no. 2, pp. 465-473, February, 2010;
[2] A. Ale, R. B. Schulz, A. Sarantopoulos et al., "Imaging performance of a hybrid x-ray computed tomography-fluorescence molecular tomography system using priors," *Medical Physics*, vol. 37, no. 5, pp. 1976-1986, May, 2010;
[3] D. Hyde, E. L. Miller, D. H. Brooks et al., "Data Specific Spatially Varying Regularization for Multimodal Fluorescence Molecular Tomography," *IEEE Transactions on Medical Imaging*, vol. 29, no. 2, pp. 365-374, February, 2010;
[4] Y. T. Lin, H. Yan, O, Nalcioglu et al., "Quantitative fluorescence tomography with functional and structural a priori information," *Applied Optics*, vol. 48, no. 7, pp. 1328-1336, Mar. 1, 2009;
[5] V. Ntziachristos, "Fluorescence Molecular Imaging," *Annu. Rev. Biomed. Eng.*, vol. 8, pp. 1-33, 2006;
[6] G. M. Turner, G. Zacharakis, A. Soubret et al., "Complete-angle projection diffuse optical tomography by use of early photons," *Optics Letters*, vol. 30, no. 4, pp. 409-411, Feb. 15, 2005;
[7] A. Sarantopoulos, G. Themelis, and V. Ntziachristos, "Imaging the Bio-Distribution of Fluorescent Probes Using Multispectral Epi-Illumination Cryoslicing Imaging," *Mol Imaging Biol*, Sep. 14, 2010;
[8] M. Freyer, A. B. F. Ale, R. B. Schulz et al., "Fast automatic segmentation of anatomical structures in x-ray computed tomography images to improve fluorescence molecular tomography reconstruction," *Journal of Biomedical Optics*, vol. 15, no. 3, pp. 036006, 2010;
[9] S. R. Arridge, "Optical tomography in medical imaging," *Inverse Problems*, vol. 15, no. 2, pp. R41-R93, April, 1999;
[10] A. Soubret, J. Ripoll, and V. Ntziachristos, "Accuracy of fluorescent tomography in the presence of heterogeneities: Study of the normalized born ratio," *Ieee Transactions on Medical Imaging*, vol. 24, no. 10, pp. 1377-1386, October, 2005;
[11] M. J. Niedre, G. M. Turner, and V. Ntziachristos, "Time-resolved imaging of optical coefficients through murine chest cavities," *Journal of Biomedical Optics*, vol. 11, no. 6, pp.-, November-December, 2006;
[12] C. Paige, and M. Saunders, "LSQR: An Algorithm for Sparse Linear Equations and Sparse Least Squares," *ACM T. Math. Software*, vol. 8, no. 1, 1982; and
[13] M. Paige, and C. Saunders, "Algorithm 583 LSQR: Sparse Linear Equations and Least Squares Problems," *ACM T. Math. Software*, vol. 8, no. 2, 1982.

Over the past few years, an increasing amount of hybrid imaging systems has been developed motivated by the improved system quality and imaging performance that can be reached when complementary modalities are combined. The most straightforward benefit of hybrid imaging systems is the seamless co-registration of images, which facilitates the super-position of information content. Additionally, advantage can be taken of the strength of one imaging modality to resolve the weakness of the other imaging modality.

Fluorescence Molecular Tomography (=FMT) is a technique developed for three-dimensional visualization of fluorescence bio-distribution in an object. The method operates in the diffuse photon regime, i.e. it detects photons that have traveled in tissues at distances that are longer than 1 mm. X-ray Computed Tomography (=X-ray CT) is a tomographic imaging method based on the direction of high-energy radiation trough an object, providing anatomical information on the object. Diffuse Optical Tomography (=DOT) is an optical tomographic imaging method aimed at the estimation of an absorption and/or scattering map of an object.

Compared to the improvements of PET images achieved after attenuation correction, the corresponding FMT image performance improvement based on hybrid implementations is expected to be more substantial. This is because photon propagation in tissue has a stronger dependence (attenuation) on the tissue optical properties compared to high-energy photons. Therefore, the development of hybrid imaging methods employing FMT has a primary goal of improving the performance of the optical method.

Several prior art imaging systems and methods are based on reconstruction of data of one modality independent from another modality. Data obtained from two or more modality systems was combined for visualization. Fluorescence tomography system data has been used for visualization together with MRI data and X-ray data.

In Ref. [1] a system was presented that combined X-ray CT and FMT in one physical housing, leading to two accurately co-registered data sets. The anatomical information from X-ray CT was subjected to a segmentation. The anatomical segmentation was used to formulate the inversion problem, leading to the object image.

In Ref. [2] a method was presented that used the data from the system mentioned above. The anatomical information from X-ray CT was subjected to a segmentation. Optical properties were assigned to the segments in the anatomical segmentation and used for the calculation of the forward model. The anatomical segmentation was used to formulate the inversion problem, leading to the object image.

In Ref. [3] anatomical information was obtained from a reference measurement with X-ray CT. A surface extracted from FMT measurements combined to a object together with the reference anatomical dataset was subjected to a segmentation. The anatomical segmentation was used to formulate a first inversion problem. Based on the object image obtained from solving the first inversion, a second inversion was formulated, leading to a final object image. As the first inversion was based on an operator of the dimensionality of the organs, the reconstruction result in ref [3] has a limited image quality only.

In Ref. [4] an absorption map of the object was estimated using DOT principles in a first inversion based on the optical data only. The absorption map was used to create a forward model. A second inversion used the optical absorption map and a segmentation based on X-ray CT information to create an object image.

The objective of the invention is to provide an improved system for creating an object image of an object under investigation being capable of avoiding limitations and disadvantages of conventional hybrid imaging techniques. In particular, the objective of the invention is to provide an improved system for the reconstruction of a fluorescence distribution in an object that makes optimal use of the combination of fluorescence tomography with a second tomographic imaging modality.

SUMMARY OF THE INVENTION

The above objective is solved with a system and/or a method for creating an object image comprising the features of the invention.

According to a first general aspect of the invention, a system for creating an object image of an object, e.g. a human, an animal or a synthetic object, like a phantom, or a part thereof, is provided, which comprises a computing device being configured for creating the object image by using first tomography data of the object provided by a first tomography system and second tomography data of the object provided by a second tomography system. According to the invention, the computing device is configured for calculating a first forward model describing the first tomography data using the second tomography data, performing a first inversion of the first forward model, calculating a parameter set using the first inversion, and performing a second inversion using the parameter set to obtain the object image to be created.

According to a second general aspect of the invention, a method for creating an object image of an object under investigation is provided, which comprises creating the object image by using first tomography data of the object provided by a first tomography system and second tomography data of the object provided by a second tomography system. According to the invention, the method comprises the steps of calculating a first forward model describing the first tomography data using the second tomography data, performing a first inversion of the first forward model, calculating a parameter set using the first inversion, and performing a second inversion using the parameter set to obtain the object image to be created.

The invention is based on the finding that the recovery of e.g. a fluorescence distribution inside an object based on fluorescence tomography data can be improved by including information obtained from imaging the same object with a second tomography system. Accordingly, the invention provides a system for obtaining an object image, featuring a computing device, preferably in combination with at least two tomography systems, wherein the data from the tomography systems are used as input for obtaining the object image. Particularly, the computing device can obtain an object image of the fluorescence distribution in an object, using fluorescence tomography data combined with second tomography data to formulate the first forward model and perform the first inversion. The second inversion is formulated based on parameters delivered by the first inversion and the second tomography data, leading to the object image.

Advantageously, the object image is created based on first tomography and second tomography data in a step-wise procedure, in which the second inversion that will provide the object image uses a parameter set obtained with the first inversion. Contrary to prior art, the first inversion is based on a complete forward model and not only an operator of the dimensionality of the organs like in ref [3]. Furthermore, a new combination of the computing device, the first tomography system and the second tomography system is proposed.

In preferred embodiments, the first tomography system is an optical tomography system that consists of at least a light source and a system for light detection. Accordingly, the first tomography system also is called optical modality. Particularly preferred, the light source is a near-infrared light source. The light source may also be a visible light source, bioluminescence or combination of the mentioned light sources. The optical system can be a continuous wave, time resolved, intensity modulated system or a combination thereof, as mentioned e.g. in ref. [5]. The source of illumination can be a point source, line source, plane source, volume source or a combination. The measurement can be done in trans-illumination, epi-illumination or a combination.

Furthermore, in preferred embodiments, the measurements are non-contact measurements using a system of lenses, pinholes, apertures or a combination thereof (see ref. [5]). The measurements may also be contact measurements, using optical guides, fiber guides, optical matching fluids, lenses or a combination.

In a particularly preferred embodiment, the first tomography system can be fluorescence molecular tomography (see ref. [5]), diffuse optical tomography, early photon optical tomography (see ref. [6]), or any other tomography method, or a combination. The waves used can be light, heat, or any other type of radiation.

Thus, in order to obtain the object image, calculations are done by the computing device using data from at least a measurement with e.g. the fluorescence tomography method. In a particular embodiment, this includes a method to determine the shape of the object, the calculation of a forward model of light propagation, the choice of an inversion method, and the calculation of an estimate of the fluorescence distribution inside the object using the forward model and inversion method. In general, the information obtained from the anatomical modality is used in one or more instances in the process of obtaining the fluorescence distribution inside the object based on at least the fluorescence tomography measurement.

Furthermore, in particularly preferred embodiments, the second tomography system is X-ray tomography. In other embodiments, the second tomography system may be Magnetic Resonance Imaging (=MRI), Ultrasound (=US) or any other modality providing anatomical information. In other embodiments the first tomography system can be combined with two or more tomography systems, including but not limited to X-ray CT, MRI and US.

In general, the second tomography system provides a tomography data set describing the object. In a particular embodiment, the second tomography system provides anatomical data that can be used to obtain information on the position, shape, size, and/or boundary of the object. Accordingly, the second tomography system also is called anatomical modality.

In another embodiment, this data may be subjected to a segmentation of the object in two or more segments. Additionally, the segmentation can include the surroundings of the object. Preferably, the boundary information can be used to define the contours defining the boundary of the object. In another embodiment, the boundary information may be used to define the transfer properties from surroundings to inside the object. In another embodiment, the boundary information may be used in the calculation of the first forward model, to define the boundary conditions of the light propagation model.

In certain embodiments, the segmentation can consist of well defined regions. In other embodiments, the segmentation consists of regions with a gradual transition between them, and/or centers of regions around which a distribution can be formed. In another embodiment, the segmentation can be defined through an analytical representation and/or in terms of correlation measures.

With the preferred application in medical imaging, the segmentation can be based on anatomical features such as organs. In other embodiments, the segmentation can be based on extraneous elements in the object such as tubes, markers, prosthesis or other materials. In other embodiments, the segmentation can be based on the use of contrast agents that are introduced in the object. For example when X-ray CT is used, the contrast agent(s) could be X-ray CT contrast agent, injected in the object.

In certain embodiments, the segmentation can be refined based on a third modality. The third modality can be a noninvasive modality, or an invasive modality such as cryo-slicing [7]. In another embodiment, the segmentation can be based on a reconstruction of the fluorescence distribution inside the object. In another embodiment, the segmentation can be based on the acquisition data from the fluorescence tomography system. In another embodiment, the segmentation can be based on the acquisition data of a combination of several imaging modalities. In other embodiments, the segmentation can be iteratively adjusted using one or more combinations of the above mentioned options.

In certain embodiments the segmentation can be used to define or adjust the boundary calculation. In other embodiments the segmentation can, or can also, be used to define or adjust the forward model. In another embodiment the segmentation can, or can also, be used to define or adjust the inversion method. In another embodiment, the segmentation can be used to select and or adjust the acquisition data of the optical modality.

In certain embodiments, the segmentation can be used to assign optical properties to different regions. The optical properties include, but are not limited to scattering coefficients, absorption coefficients, reflection coefficients, and/or anisotropy coefficients. In another embodiment, the segmentation can also be used to define or update the optical properties before assigning them.

In certain embodiments the segmentation can be used to define different light propagation models for different regions. This can be done in combination with the calculation or update of the optical properties. The different light propagation models include, but are not limited to, diffusion based models, Monte-Carlo based models, Transport equation based models or combinations thereof.

In another aspect, several optical modalities can be combined with the anatomical modality. In one particular embodiment, data from one modality can be used for the reconstruction of a part of the object and data from another modality can be used to reconstruct a different part of the object. This can be based on the segmentation of the object. It can also be based on the light propagation models set to the different regions in the segmentation. For example a different optical modality can be used to reconstruct the fluorescence in the boundary region of the object. In another embodiment this can be the same optical modality but in a different illumination detection setup. In another embodiment this can be the same optical modality but using a different wavelength.

In a particular embodiment, the segmentation can be used to define boundaries or provide other structural information to adjust the grid or mesh used for the calculation of the forward model. This can be a mesh for a Finite Element Method, Boundary Element method, Finite volume method, or any other numerical method for calculating a forward model. The structural information can be used to define size, shape, number or any other aspects of a mesh or grid. The structural information can also be used when an analytical formulation is used, in that aspect it can be used to split the analytical solution based on the structures.

In a particular embodiment, the information from the anatomical modality can be used to determine areas of light tunneling, areas of air, or other possible areas creating light propagation forms not properly captured in the model used for light propagation. The identification of these areas can be used to adjust the forward model or to select or adjust the acquired data.

The anatomical information can also be used to correct the acquired data for the effects of a uniform level of background fluorescence or for background levels that are dependent on the anatomical regions.

The anatomical modality can also be used to aid the set up of a simulation to simulate the acquired data. This can then be subsequently used to calculate correlations between simulated and acquired data, based on which the data can be selected or adjusted.

According to the invention, a first inversion of the first forward model is conducted. The inversion can be implemented according to the following embodiments. In a particular embodiment, the anatomical modality and or the segmentation based on the anatomical modality is used as a basis to shape a penalty matrix used in the inversion. In another embodiment, the information can be used to form a probability distribution, to shape a left and or right preconditioner, to develop functionals that can be added to the inversion function, and/or to select an inversion algorithm, such as but not limited to ART, LSQR, conjugate gradients or any other inversion algorithm including iterative and also direct inversion methods. In yet another embodiment, the information is used to account for irregularities expected in the forward model.

In a particular embodiment, the anatomical information can be used to define the shape, size, number and other features of the voxels into which the reconstructed solution is split up. In case of an analytical method used, the information can also be used to define the solution in terms of different regions. In another embodiment the information can also be used to define the solution in terms of different correlations between the different features of the grid or regions.

In some embodiments, the information obtained from the anatomical modality is used to post-process the reconstruction. In one embodiment the anatomical modality is used to obtain a measure of quality of the reconstruction. In another embodiment, the anatomical modality is used to threshold or suppresses certain features of the reconstruction. In another embodiment, the anatomical modality is used to remove boundary artifacts or other artifacts from the reconstruction.

According to the invention, a second inversion is performed using the parameter set derived from the first inversion to obtain the object image to be created. As a preferred example, the first forward model can be subjected to the second inversion. Alternatively, another forward model, like e.g. a forward model calculated using different attenuation properties can be subjected to the second inversion.

According to a further advantageous embodiment of the invention, another inversion (third inversion) can be implemented using the second tomography data to derive optical properties for the first forward model. The third inversion can be performed before the first and second inversion, or it could also be performed in the same way as the first and second inversion.

If, according to a further embodiment of the invention, an estimation of a background signal in the object is subtracted from the first tomography data, the image quality can be further improved. Preferably, the estimation of the background signal is calculated using the second tomography data.

As a further advantage and optional new feature of the invention, the information from the second tomography data can be used not only for calculating the first forward model, but also for controlling the first tomography system. To this end, in a further embodiment of the invention, information is extracted from the second tomography data and provided as input for the first tomography system. In particular, the second tomography data contains information on the object that can be used for the acquisition of data with the first tomography system (the acquisition setup).

According to the invention, a parameter set is calculated using the first inversion. As a preferred example, the parameter set comprises regularization parameters which are used in the second inversion to obtain the object image.

If according to a further embodiment of the invention, the second tomography image is subjected to a segmentation, so that the second tomography image is divided into multiple image segments, the parameter set preferably is derived from the segmented second tomography image and the light propagation properties of the multiple image segments. With this embodiment, the second inversion preferably is formulated using the light propagation properties of the multiple image segments.

Advantageously, the object image can be further improved, if the inversion process includes at least one further inversion, wherein the object image to be obtained is reconstructed using the forward model being adjusted using the object image obtained with the second or any previous inversion, and wherein the at least one further inversion is formulated using at least one further parameter set derived from the object image obtained with the second or any previous inversion. As a preferred example, the at least one further inversion is formulated using the light propagation properties of the multiple image segments.

According to a further preferred embodiment of the invention, the first forward model, the first inversion, the second inversion and/or the at least one further inversion is implemented additionally using experience based information and/or invasive access based information about the object.

According to a further particularly preferred embodiment of the invention, the system of the invention comprises not only the computing device, but the combination of the computing device with at least the first tomography system and the second tomography system. The computing device is connected with the first, second and optionally any further tomography system. In preferred embodiments, the involved tomography systems are integrated in one physical housing. For example, an optical tomography system and an X-ray tomography system may be mounted on one rotating gantry. In other embodiments the involved tomography systems may have separate physical housings. For example a system for optical tomography system and a system for X-ray tomography are used, and the data form both systems is used as input for the computing device in order to obtain an object image.

During the acquisition of the data, data that is obtained from one system may be used for the configuration of acquisition parameters for the acquisition of another system. For example, in the case that the first tomography system is a fluorescence tomography system and the second tomography system is an X-ray CT system, integrated in one housing, or not integrated in one housing. Then the anatomical information contained in the X-ray CT acquisition may be used to estimate the boundaries of the object, and/or internal structures of the object. A source pattern used for scanning with the fluorescence tomography system may be based on the boundaries and/or internal structures observed in the X-ray CT data. The X-ray CT data may have been processed in order to obtain a volume of the object, in that way facilitating the estimation of the boundaries and/or internal structures of the object.

According to a further preferred embodiment, the system of the invention is configured for a hybrid visualization of the object image and second tomography data of the object. With this embodiment of the inventive method, the object image and the second tomography data are presented simultaneously, e.g. on a display and/or a printed image.

With more details, the computing device preferably comprises a data storage device adapted for storing measured first (in particular optical) tomography data and measured second tomography data of the object, a first reconstructing device adapted for reconstructing a second tomography image using the second tomography data, and a second reconstructing device adapted for reconstructing the object image to be obtained using the optical tomography data. Preferably, the second reconstructing device is adapted for calculating the first forward model using a first parameter set derived from the second tomography image and for subjecting the first tomography data to the inversion process using the forward model, wherein the inversion process includes a first inversion and a second inversion, wherein with the first inversion, an approximated optical image is reconstructed using the forward model, and with the second inversion, the object image to be obtained is reconstructed using the forward model being adjusted using the approximated optical image, wherein the second inversion is formulated using a second parameter set derived from the non-optical image.

BRIEF DESCRIPTION OF DRAWINGS

Further details and advantages of the invention are described in the following with reference to the attached drawings, which show in.

PREFERRED EMBODIMENTS OF THE INVENTION

Embodiments of the inventive system and method are described in the following with particular reference to the processing of the first and second tomography data, in particular the calculation of the first forward model, the first inversion, the calculation of a parameter set using the first inversion, and the second inversion. Details of the structure and operation of the first, second and optionally any further tomography system are not described as far as they are known as such from conventional techniques.

Figure 1:
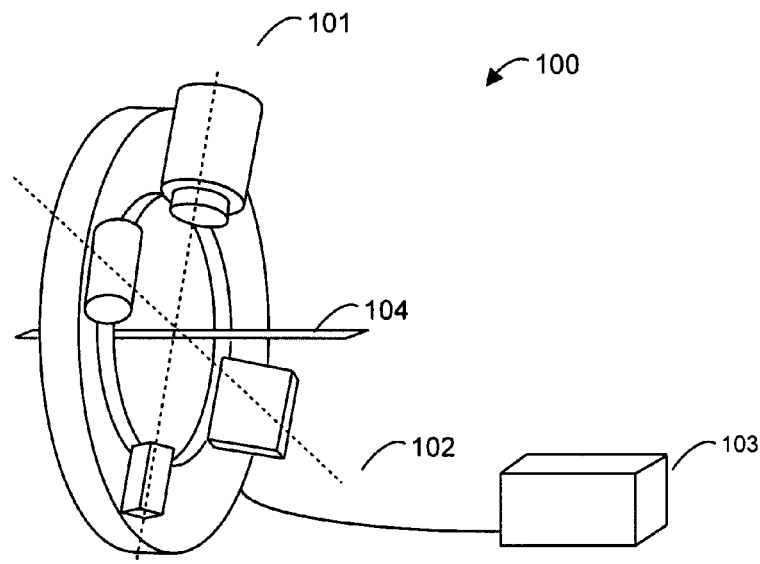
FIG. 1 a preferred embodiment of an inventive system that combines a computing device and tomography systems.

FIG. 1 schematically illustrates a system 100 of an embodiment of the invention combining a first tomography system 101 with a second tomography system 102 and a computing device 103 that uses data from both tomography systems to create an object image as described below. The first tomography system 101 and the second tomography system 102 are rotatably arranged on a gantry, like in a conventional CT device. A carrier device 104 is arranged on a rotation axis of the gantry for accommodating an object under investigation. As an example, the first tomography system 101 comprises a combination of a light source and a light detector array for collecting fluorescence light, as described e.g. in [1]. The second tomography system 102 comprises e.g. a combination of an X-ray source and an X-ray detector, like in a conventional CT device. As noted above, with other embodiments, another tomography system can be used as the second tomography system. The computing device 103 comprises a computer which may include hardware components configured for implementing certain data processing steps, like e.g. the inversions, and/or at least one processor for a software based processing of the inventive method.

Figure 2:
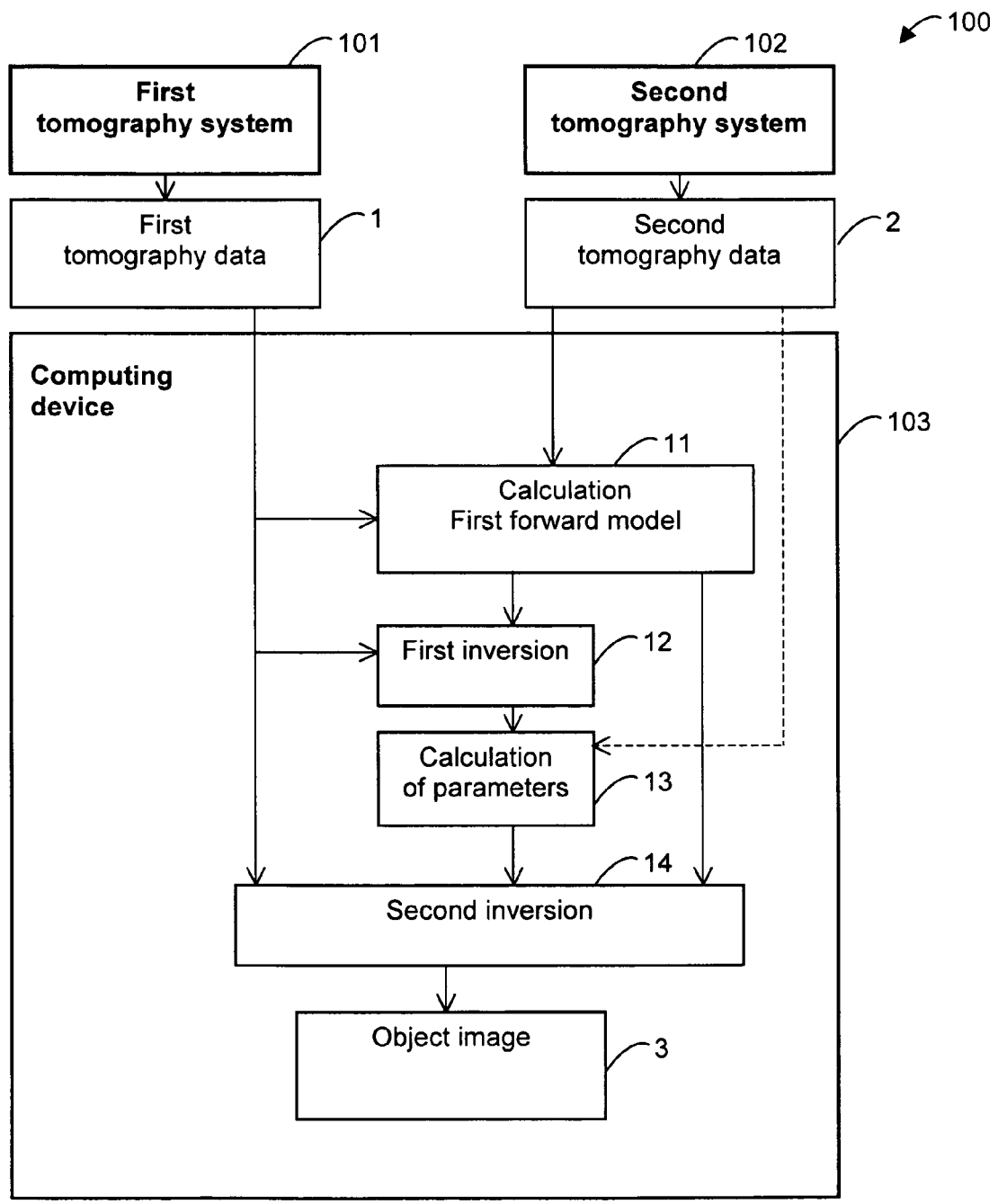
FIG. 2 a flow chart of steps followed by the system to obtain an object image, particularly the steps inside the computing device.

FIG. 2 is a block diagram with further details of the system 100 for creating an object image based on the data from the two tomography systems. The first tomography system 101 delivers first tomography data 1. The second tomography system 102 delivers second tomography data 2. Data from both systems 102,103 form the input for the computing device 103. The computing device 103 performs several calculations to obtain the object image 3. The first and second tomography data 1, 2 are used for the calculation of a forward model 11. The forward model 11 and the first tomography data 1 are used to calculate a first inversion 12. Based on the first inversion 12 a parameter set is calculated 13 that is used to formulate the second inversion 14, leading to the object image 3. Steps 11 to 14 are performed as described in the practical example below (see also FIG. 4).

The process illustrated in FIG. 2 can be repeated in an iterative fashion. The object image can be provided as an intermediate image, which is used e.g. for further adjusting the first forward model 11.

Figure 3:
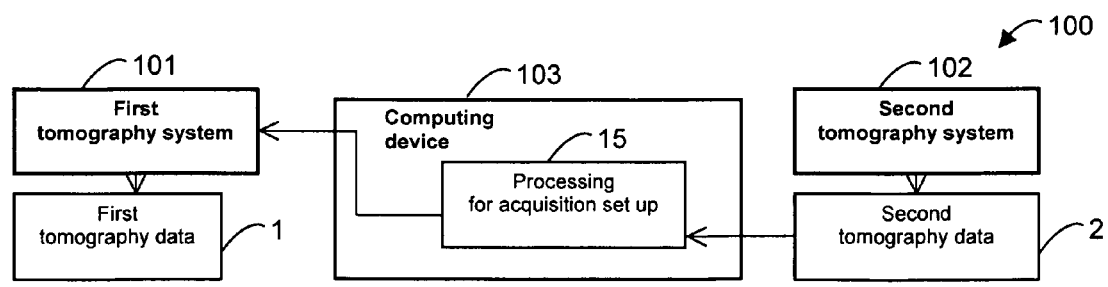
FIG. 3 a flow chart that illustrates how information from one tomography system can be used for the set-up of the acquisition with another tomography system.

FIG. 3 is a block diagram illustrating the task of the computing device 103 during acquisition of the data 1, 2. The second tomography system 102 delivers second tomography data 2 to the computing device 103. The computing device 103 performs processing steps 15 that result in information for the acquisition setup of the first tomography system 101. In certain embodiments, based on the second tomography data 2, the processing steps 15 result in data representing the boundaries and/or internal structures of the object. The computing device 103 can use the boundaries and/or internal structures for the estimation of a region of interest within the object. Alternatively or additionally, the computing device 103 can compute a volume of the object from the second tomography data before estimating the boundaries/internal structures. The estimation of the region of interest can be used to setup acquisition parameters as input for the first tomography system 101. Thus, the first tomography system 101 can be controlled for collecting fluorescence data 1 even from the region of interest. As an example, the acquisition parameters may consist of a source pattern that is defined based on the estimated internal structures. For example in case of imaging the lung area of a mouse, this can be a grid of for example, 3×6 source positions that covers the shape and position of the lungs. In other embodiments the acquisition parameters may consist of an indication of a region where source placement will be optimal. In other embodiments the acquisition parameters may, or may also, contain parameters related to the set up of the detection. This step can also be implemented in case the two acquisition procedures are interleaved.

Figure 4:
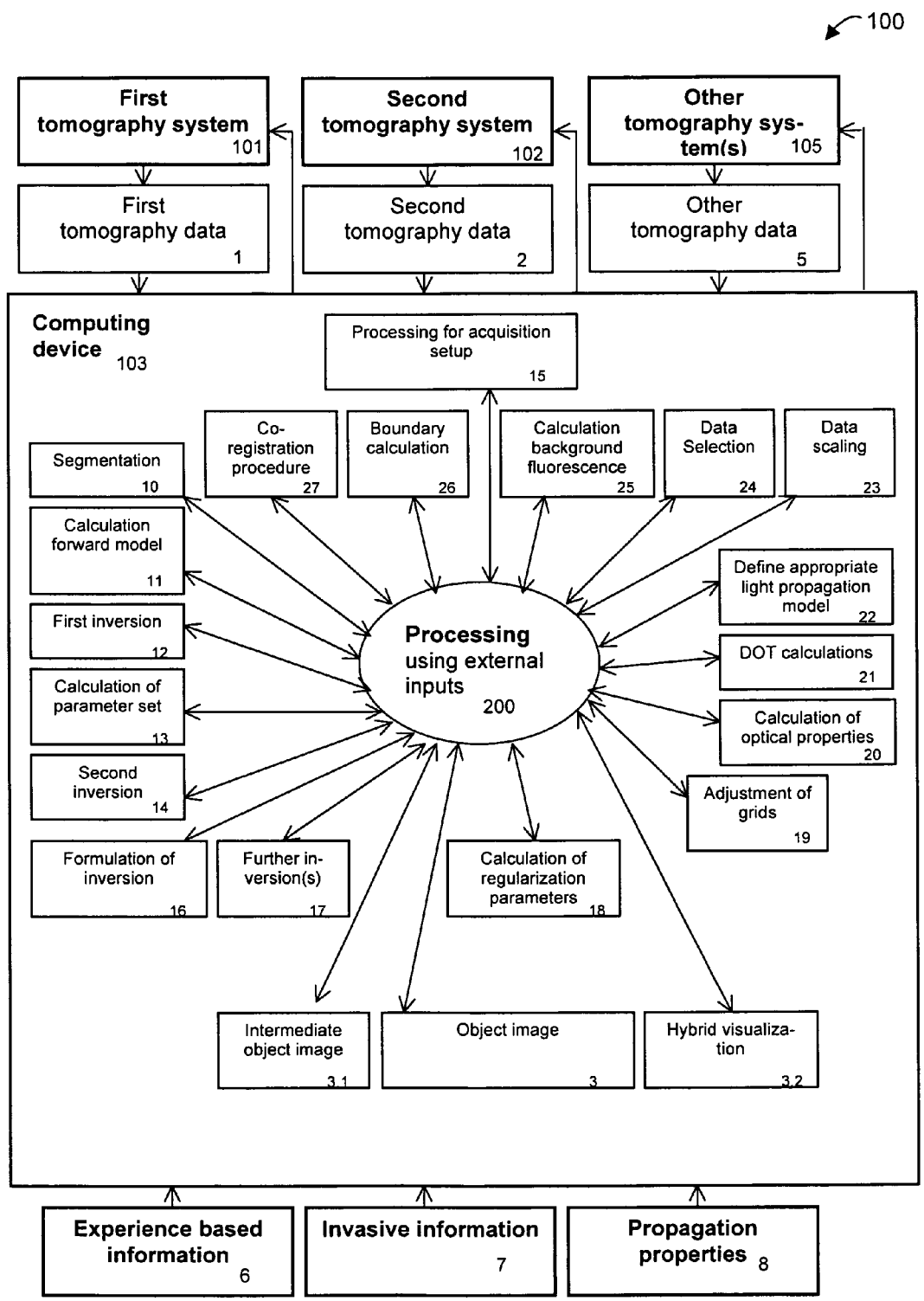
FIG. 4 a flow chart of possible combinations of steps that the systems and in particular the computing device can perform.

FIG. 4 is a further block diagram illustrating multiple embodiments of the invention, in particular the tasks of the computing device 103. The computing device 103 receives as input: first tomography data 1 delivered by the first tomography system 101, and second tomography data 2 delivered by the second tomography system 102. Additionally, the computing device possibly receives as input: other tomography data 5 delivered by other tomography system(s) 105, experience based information 6, invasive information 7 and/or propagation properties 8. The computing device 103 uses the external input for performing processing tasks 200. Some of these tasks, such as the processing for acquisition setup 15 (see e.g. FIG. 3) result in information that is returned to one or more of the tomography systems 101, 102, 105 (indicated with the arrows).

FIG. 4 includes a large number of tasks, which according to the invention can be implemented as alternatives or in combination (including sub-combinations). The tasks illustrated in FIG. 4 can be performed multiple times, and/or in an iterative manner. The result from one task can be used for the performance of a different task. The final aim of the tasks illustrated in FIG. 4 is to obtain the object image 3. The essential feature of all variants included in FIG. 4 is the use of the second tomography data 2 to improve the object image 3. The tasks will be further described in the following.

Segmentation 10

The anatomical object from the anatomical modality (second tomography system 102) can be used to create a segmentation 10 of the object into two or more regions. These regions can be organ based or based on other anatomical features observed in the anatomical object.

Forward Model 11

The segmentation 10 can be combined with prior determined optical properties (propagation properties) 8 as input for the calculation of the forward model 11. The optical properties 8 can be obtained from measurements with a different modality, for example the optical properties 8 can be obtained by mapping optical properties calculated with diffuse optical tomography 21 to the anatomical regions. The first inversion 12 can be used to determine or update calculated propagation properties 20. The update of the propagation properties can consist of updating the optical properties of the object or surroundings, the reflective properties of the object, or an update of the propagation model 22 that is used.

It can be appropriate to define different propagation models for different regions 22 as identified in an intermediate object image 3.1 or the object image 3 obtained in a first iteration of the procedure. For example based on the first inversion 12 and the first optical property distribution 20 a part of the boundary of the object can be described by the Monte Carlo model for light propagation, and a different part by the diffusion equation for light propagation. When the optical properties are updated based on the first inversion 12, the optical path lengths can change, and the regions can be redefined.

Forward model 11 of FIG. 4 does not include the calculation of the first forward model as in FIG. 3 only but rather further calculations and/or adjustments. As an example, when different optical properties are used for fluorescence and excitation light propagation, the forward model 11 can be updated after each iteration in the reconstruction based on the estimated fluorescence distribution 3.1. Furthermore, in certain embodiments, multiple forward models 11 can be defined. The first inversion 12 can use a different forward model than the second inversion 14 or further inversions 17.

Parameter Calculation 13

The first tomography data 1 combined with the second tomography data 2 are used to calculate a first inversion 12. This first inversion 12 delivers parameters 13 to the second inversion 14. The result of the second inversion 14 can be used to update the forward model 11, and a further inversion step 17 can be performed. This can be repeated until the final inversion is found.

Inversion Formulation 12, 14, 17, 16

The second tomography data is used for the formulation of the inversion algorithm, e.g. in terms of a penalty matrix (see example below). Regularization parameters 18 to fill this penalty matrix can be calculated and used to adjust the formulation of the inversion 16.

During the processing of the data, the grids or node distribution used in the forward model and/or for the inversion can be adjusted 17. This can be based on information from the second tomography system 102. For example, the grid can be finer in one anatomical region than in another anatomical region, in case it is expected to recover smaller targets inside the specific anatomical region.

Pre-Processing

Second tomography data 2 obtained from the second (anatomical) tomography system 102 can be used to determine the boundaries of the imaged object 26. These boundaries can be used as input for the setup of the forward model calculation. Alternatively, the boundaries can be obtained from data acquired with a white light tomography system, or from reference measurements based on previous experience 6.

The first tomography data 1 from the first tomography system 101, for example the optical tomography system can be adjusted using the second tomography system 102, for example a tomography system that delivers anatomical information. An inversion together with anatomical information can be used to adjust the data. The inversion can give information on the region of interest, sources of noise, and features in the optical data that are difficult to capture by the forward model. Examples of the adjustments are data selection 24, masking, or correlating forward modeled images with the measurement data to distinguish between important and less important elements in the data.

In certain embodiments, a measure for data scaling can be calculated 23. This can be a vector, matrix or function to indicate the relative importance of data delivered by the first tomography system. For example, the second tomography data 2 can indicate a region of interest for the inversion 12. Data outside of the region of interest can be scaled in a different way than data inside the region of interest. By using the data scaling vector, matrix or function in the inversion, data that will increase the accuracy of the object image to be obtained will have a larger influence during the inversion, leading to a better result for the object image.

In case two or more separate systems are used, a co-registration procedure can be applied 27, that uses for example fiducial markers to determine the position of the object in one system compared to the position of the object in another system.

In certain embodiments, a background fluorescence calculation 26 can be performed. The background fluorescence calculation can consist of a subtraction of calculated background fluorescence from the tomographic data. The background fluorescence calculation can be based on the combination of the first and second tomography data 1, 2. For example, by estimating the background fluorescence based on distances from source position to detector position of the first tomography system 101 using the second tomography data.

Post-Processing

Second tomography data 2 obtained from the second tomography system 102, in particular an anatomical volume from the anatomical modality can be used for hybrid visualization of the object image and the anatomical volume, and/or the segmentation 3.2.

In other embodiments, different combinations of updates can be made in between inversion updates, finally leading to the object image 3, 3.2.

Practical Example

In the implementation of the invention that has been reduced to practice, the object image is obtained with the described system in the following.

The first tomography system 101 in this implementation is the FMT system that is part of the hybrid system described in [1], the second tomography system is the X-ray CT system that is part of the hybrid system described in [1]. FMT data and X-ray CT data is acquired from an object (a mouse). The X-ray CT data is subject to a segmentation [8], resulting in a segmentation of the object in anatomical regions: bones, lungs, heart and remaining tissue. The boundary of the object is calculated based on the X-ray CT data.

A forward model is calculated based on the FMT data and X-ray CT data as in ref. [2]. Generally, the forward model consists of Greens functions, based on the diffusion equation, that are calculated with the Finite Element Method. The forward model is calculated as known in the art, e.g. using available software packages. With more details, the forward model is based on a description of the light propagation in terms of the diffusion approximation to the radiative transport equation [9, 10], which is applicable for small animal imaging. A set of two coupled diffusion equations is used to describe light propagating at the emission and excitation wavelength. The normalized Born approximation is applied [10]; the emission measurements are normalized by the measured transmittance. For one source-detector pair the resulting linear problem formulated in terms of Green's functions is given by $$\frac{U_m(r_{sd})}{U_x(r_{sd})} = \sum_\Omega \frac{G(r_s, r)n(r)G(r, r_d)}{G(r_s, r_d)} \Delta V. \quad (1)$$

The right hand side is a sum over the voxels into which the imaged volume $\Omega$ is discretized. The Green's functions G are computed using the Finite Element Method on a mesh generated from the X-ray CT volume data. $G(r_s,r)$ represents the Green's function describing light propagating from source position $r_s$ to position r inside the volume, $G(r,r_d)$ describes the light propagating from the point inside the volume to the detector position $r_d$, and $G(r_s,r_d)$ is the normalization term. The volume of the voxels is included by the term $\Delta V$ and $n(r)$ is the unknown fluorochrome distribution inside the volume. For the total number of source-detector pairs $N_{data}$, the resulting linear problem is written as y=Wn, where y of size $1 \times N_{data}$ is the normalized data computed from the measurements at the surface, W of size $N_{data} \times N_{voxels}$ is called the weight matrix and n of size $1 \times N_{voxels}$ denotes the fluorescent source.

Optical attenuation properties are derived from published values [11] and assigned to the anatomical regions. The optical attenuation coefficients are used during the calculation of the forward model. In this implementation the attenuation properties are assigned to the nodes in the Finite Element Mesh, corresponding to the anatomical region in which the node is placed.

A first inversion 12 of the described forward model 11 is performed, resulting in an intermediate object image. The inversion consists of least squares minimization of the difference between the measured photon density y and the photon density as predicted by the forward model 11, given by $W\hat{x}$ with $\hat{x}$ the estimated fluorochrome concentration. A penalty term is included to regularize the problem. The resulting function to be minimized Q is given by:

$$Q = \underbrace{\|W\hat{x} - y\|^2}_{residual} + \underbrace{\lambda^2 \|L\hat{x}\|^2}_{penalty\ term}, \quad (3)$$

where $\lambda$ is the regularization parameter, and L is the penalty matrix. The regularization parameter $\lambda$ determines the importance of the penalty term in the total problem. In particular in contrast to reference [3], for the first inversion, the penalty matrix is the identity matrix, L=I. The hybrid LSQR algorithm [12, 13] is used to perform the minimization. The object image obtained from the first inversion gives an indication of the fluorescence distribution.

The object image is used to determine a set of parameters. The parameters are calculated from the object image and the anatomical segmentation by taking the sum or average of fluorescence signal in the object image corresponding to each of the segments.

The inversion formulation is adjusted by using the calculated parameters for the formulation of the penalty matrix. In this implementation, the penalty matrix is a diagonal matrix with weights $\alpha$. Each segment m is assigned a certain weight $\omega_m$, enforcing stronger or weaker regularization per segment. The X-ray CT image generally has a higher resolution than the voxel size used for FMT inversion. The resolution of the XCT data is taken into account, by assigning each voxel to its underlying anatomical segments proportionally through a segmentation matrix $C=(c_{i,m})$ of size $N_{segments} \times N_{voxels}$, where $c_{i,m}$ is the volume percentage of voxel i that is contained in segment m [2]. Segment weights were calculated from the calculated parameter set by taking the inverse of the parameters and scaling between 1 and 4. Voxel weights $\alpha_i$ proportional to segment occupation were then calculated by multiplying the calculated segment weights by the segmentation matrix. The penalty matrix is formed by placing the calculated weights per voxel on the diagonal of the penalty matrix. The updated inversion formulation is used for the second inversion.

The second inversion 14 results in an updated object image. The obtained object image can be used to update the parameter set and repeat the adjustment of the inversion formulation. This can continue iteratively until the final object image is found.

Additionally a background fluorescence subtraction method was implemented. The background fluorescence estimation consists of estimating the distance from sources at the side of the laser source to surface of the object at the side of the CCD camera, for each projection angle using the optical and anatomical information. The distances are scaled by an estimated proportionality constant, resulting in estimated background fluorescence images for each scanned source. The estimated background fluorescence images can be subtracted from the acquisition images before inversion.

Figure 5:
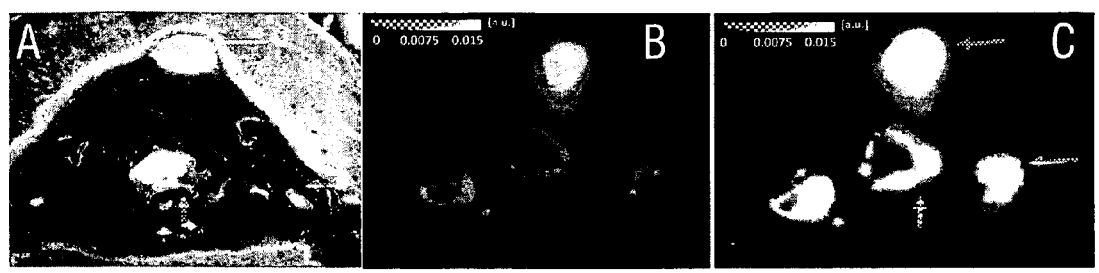
FIG. 5 an experimental result obtained with the system of the invention.

Finally the anatomical volume is used for hybrid visualization of the object image together with the X-ray CT volume. FIG. 5 shows results obtained using this particular embodiment. FIG. 5A shows a reference image for validation, consisting of a planar fluorescence image of a transversal slice of the object overlaid on an RGB image of the transversal slice, FIG. 5B shows a hybrid visualization of a transversal slice of the object image obtained after the first inversion and the anatomical volume, while FIG. 5C shows a hybrid visualization of a transversal slice of the object image obtained after the second inversion and the anatomical volume.

The features of the invention disclosed in the above description, the drawings and the claims can be of significance both individually as well as in combination for the realisation of the invention in its various embodiments.

The invention claimed is:

1. A system for creating an object image of an object under investigation, comprising:
   a computing device being configured for creating the object image by using first tomography data of the object provided by a first tomography system and second tomography data of the object provided by a second tomography system,
   wherein the computing device is configured for
   calculating a first forward model describing the first tomography data using the second tomography data,
   performing a first inversion of the first forward model,
   calculating a parameter set using the first inversion, and
   performing a second inversion using the parameter set to obtain the object image to be created.

2. The system according to claim 1, wherein the computing device is configured for
   performing the second inversion using the second tomography data.

3. The system according to claim 1, further comprising performing a third inversion step using the second tomography data to derive optical properties for the first forward model.

4. The system according to claim 1, wherein the computing device is configured for:
   subtraction of an estimation of a background signal in the object from the first tomography data.

5. The system according to claim 1, wherein the computing device is configured for:
   extracting information from the second tomography data and providing it as input for the first tomography system.

6. The system according to claim 1, wherein
   the parameter set comprises regularization parameters.

7. The system according to claim 1, wherein the computing device is configured for:
   subjecting the second tomography image to a segmentation, so that the second tomography image is divided into multiple image segments, wherein
   the parameter set is derived from the segmented second tomography image and light propagation properties of the multiple image segments.

8. The system according to claim 7, wherein
   the second inversion is formulated using the light propagation properties of the multiple image segments.

9. The system according to claim 1, wherein
   the inversion process includes at least one further inversion, wherein
   the object image to be obtained is reconstructed using the forward model being adjusted using the object image obtained with the second or any previous inversion, and wherein the at least one further inversion is formulated using at least one further parameter set derived from the object image obtained with the second or any previous inversion.

10. The system according to claim 9, wherein
the at least one further inversion is formulated using light propagation properties of the multiple image segments.

11. The system according to claim 1, wherein the computing device is configured for:
further adjusting at least one of the forward model, the first inversion, the second inversion and at least one further inversion using at least one of experience based information and invasive access based information about the object.

12. The system according to claim 1, wherein
the second tomography data are provided by at least one of an X-ray computed tomography system (CT data), a magnetic resonance imaging tomography system (MRI data) an ultra-sound tomography system (US data), and white light tomography and/or
the first tomography data are provided by at least one of diffuse optical tomography, fluorescence mediated tomography, near-field optical tomography, early photon optical tomography and thermal tomography.

13. The system according to claim 1, being configured for:
hybrid visualization of the object image and second tomography data of the object.

14. The system according to claim 1, further comprising
the first tomography system and the second tomography system.

15. The system according to claim 1, wherein the computing device comprises:
a data storage device adapted for storing measured first tomography data and measured second tomography data of the object,
a first reconstructing device adapted for reconstructing a second tomography image using the second tomography data, and
a second reconstructing device adapted for reconstructing the object image to be obtained using the optical tomography data, wherein
the second reconstructing device is adapted for calculating a forward model using a first parameter set derived from the second tomography image and for subjecting the first tomography data to an inversion process using the forward model, wherein the inversion process includes a first inversion and a second inversion, wherein with the first inversion, an approximated optical image is reconstructed using the forward model, and with the second inversion, the object image to be obtained is reconstructed using the forward model being adjusted using the approximated optical image, wherein the second inversion is formulated using a second parameter set derived from the non-optical image.

16. A method of imaging an object under investigation, comprising the steps of
collecting first tomography data of the object,
collecting second tomography data of the object, and
reconstructing an object image with a system according to claim 1.

17. The system according to claim 15, wherein
the data storage device is adapted for storing measured first optical tomography data.

* * * * *